United States Patent [19]

Shaddy

[11] Patent Number: 5,655,805

[45] Date of Patent: Aug. 12, 1997

[54] CUP HOLDER

[76] Inventor: Joseph G. Shaddy, 6601 Stones Throw Rd., Omaha, Nebr. 68152

[21] Appl. No.: 677,919

[22] Filed: Jul. 10, 1996

Related U.S. Application Data

[63] Continuation-in-part of Ser. No. 555,578, Nov. 8, 1995, Pat. No. 5,613,720.

[51] Int. Cl.$^6$ .............................. A47J 45/07; B65D 23/10
[52] U.S. Cl. .................... 294/31.2; 220/738; 220/739
[58] Field of Search ................................. 294/27.1, 31.2, 294/32, 33; 220/738, 739, 753, 758, 903; 16/114 R, 116 R, 116 A; 229/402

[56] References Cited

U.S. PATENT DOCUMENTS

| | | | |
|---|---|---|---|
| 2,029,429 | 2/1936 | Koons | 294/33 |
| 2,137,884 | 11/1938 | Weeks | 294/31.2 |
| 3,088,767 | 5/1963 | Deal | 294/31.2 |
| 3,104,788 | 9/1963 | Wood | 224/45 |
| 3,717,277 | 2/1973 | Stengle, Jr. | 220/758 |
| 3,773,287 | 11/1973 | Hechinger | 294/31.2 |
| 4,158,464 | 6/1979 | Bowen et al. | 294/31.2 |
| 4,552,276 | 11/1985 | Buch | 294/31.2 |
| 4,654,274 | 3/1987 | DeMars | 428/542.4 |
| 4,685,583 | 8/1987 | Noon | 220/94 R |
| 4,715,633 | 12/1987 | Brink et al. | 294/31.2 |
| 4,874,109 | 10/1989 | Cook | 220/94 R |
| 5,147,067 | 9/1992 | Effertz | 220/739 |
| 5,238,161 | 8/1993 | Kimishima | 224/217 |

FOREIGN PATENT DOCUMENTS

| | | | |
|---|---|---|---|
| 253491 | 6/1927 | Italy | 294/31.2 |
| 4-253642 | 9/1992 | Japan | 220/738 |
| 558159 | 1/1975 | Switzerland | 220/738 |
| 751627 | 7/1956 | United Kingdom | 294/31.2 |

*Primary Examiner*—Dean Kramer
*Attorney, Agent, or Firm*—Zarley, McKee, Thomte Voorhees & Sease; Mark D. Frederiksen

[57] ABSTRACT

A cup holder includes a ring of thermally insulative material having an inner surface and an outer surface, with a strip of resilient compressible material affixed to the inner surface circumferentially around the entire extent thereof. A handle is mounted on the outer surface of the ring for supporting the ring and a cup held in the ring. The ring inner surface is generally cylindrical in shape, while the outer surface has an arcuate shape forming a convex shape from the upper to the lower edge of ring. The handle has a vertically oriented elongated oval-shaped aperture therethrough to receive at least two fingers of a human hand. A projection depends from the lower end of the handle loop adjacent a distal side to form a concave finger grip between the projection and a lower edge of the loop. A pair of depressions are formed in a forward portion of the outer surface of the ring and extend circumferentially, to receive the palmar side of the first and second fingers of the hand. A third depression diametric the first pair of depressions receives the palmar surface of the thumb, so that the ring may be gripped and supported by the hand.

14 Claims, 2 Drawing Sheets

CUP HOLDER

CROSS-REFERENCE TO RELATED APPLICATION

This is a continuation-in-part application of Ser. No. 08/555,578 filed Nov. 8, 1995 now U.S. Pat. No. 5,613,720.

TECHNICAL FIELD

The present invention relates generally to support handles for cups, and more particularly to an improved cup holder which will selectively support a variety of cup sizes, and insulate the hands from temperature extremes on the cup.

BACKGROUND OF THE INVENTION

Disposable cups, utilized for coffee, tea, and other beverages, are typically formed from paper, cellular plastic foam, or other plastic materials. In most cases, such disposable cups have smooth sides and are not equipped with handles.

The main problem with paper or noncellular plastic materials for disposable cups, is the poor insulation characteristics of such materials. For this reason, hot beverages, such as coffee or tea, can be hot to the touch and prevent a consumer from conveniently holding the cup. Even cups having good insulation characteristics, such as insulating foam cups, can become hot, or wet to the touch, and difficult to handle.

A second problem associated with disposable cups is the difficulty of handling such cups when no handles are present. Examples of U.S. patents granted on inventions providing handles to cups and cans include U.S. Pat. No. 4,685,583 to Noon, U.S. Pat. No. 5,147,067 to Effertz, U.S. Pat. No. 4,874,109 to Cook and U.S. Pat. No. 4,715,633 to Brink et al.

A problem associated with prior art attachable cup handles is the requirement that the cup or beverage container be of a single size for a particular handle. Beverage containers of various sizes therefore require various sizes of cup handles.

SUMMARY OF THE INVENTION

It is therefore a general object of the present invention to provide an improved cup handle for disposable cups.

Another object of the present invention is to provide an improved cup handle which insulates the fingers from the cup carried in the handle.

A further object is to provide an improved cup handle which is selectively attachable to a wide variety of cup sizes.

Still another object of the present invention is to provide an improved cup handle which is economical to manufacture and refined in appearance.

These and other objects will be apparent to those skilled in the art.

The cup holder of the present invention includes a ring of thermally insulative material having an inner surface and an outer surface, with a radially inwardly directed band formed on the inner surface, with a textured inward surface thereon. A handle mounted on the outer surface of the ring for supporting the ring and a cup held in the ring. The handle has a vertically oriented elongated oval-shaped aperture therethrough to receive at least two fingers of a human hand. A projection depends from the lower end of the handle loop adjacent a distal side to form a concave finger grip between the projection and a lower edge of the loop. A thumb depression is formed in the outer surface of the ring diametric to the handle to receive the palmar surface of the thumb, so that the ring may be gripped and supported by the hand.

DESCRIPTION OF THE PREFERRED EMBODIMENT

Figure 1:
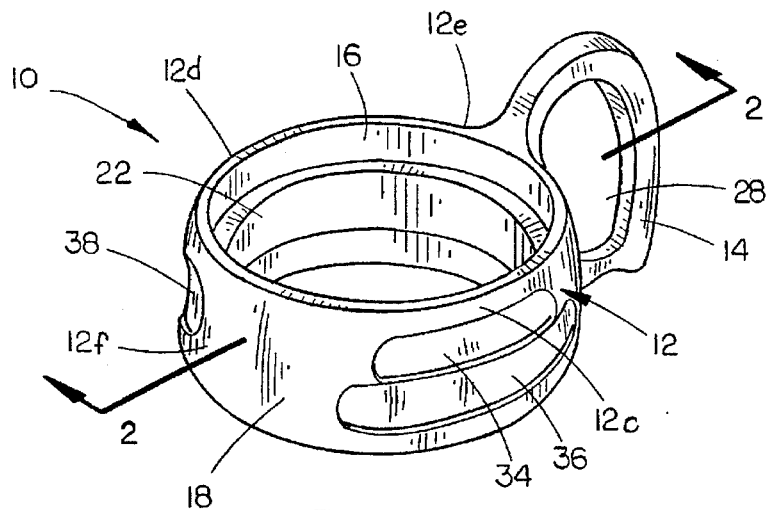
FIG. 1 is a perspective view of the cup holder of the present invention.

Referring now to the drawings, in which similar or corresponding parts are identified with the same reference numeral and more particularly to FIG. 1, the cup holder of the present invention is designated generally at 10 and includes a rigid ring 12 of thermally insulative material such as plastic. Ring 12 includes an inner generally cylindrical surface 16, and an outer arcuate surface 18. A handle 14 is affixed to outer surface 18 for supporting ring 12.

Figure 2:
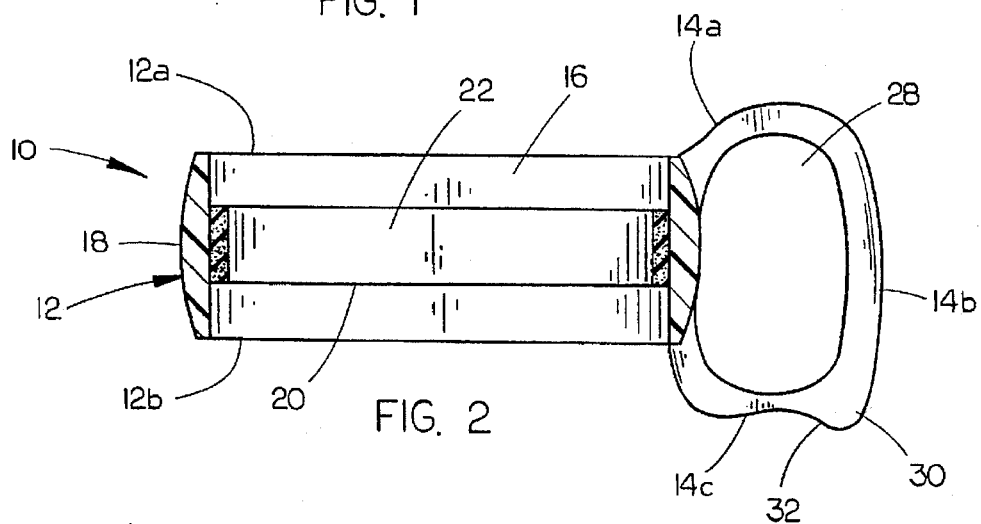
FIG. 2 is a vertical sectional view through the cup holder.

As shown in FIG. 2, ring 12 has upper and lower edges 12a and 12b respectively with outer surface 18 forming a convex surface from the upper to lower edge. Inner surface 16 has a strip 20 of compressible material, such as foam, mounted intermediate the upper and lower edges 12a and 12b. Strip 20 has an inward face concentric with ring inner face 16 which will frictionally grip a disposable cup. Two different size cups 24 and 26 are shown in holder 10 in FIGS. 3 and 4, demonstrating the versatility of cup holder 10 to hold and support cups of various sizes.

Handle 14 is preferably formed of a rigid thermal insulative material formed in, a vertically oriented loop. A vertically extending elongated oval-shaped aperture 28 within the loop of handle 14 provides sufficient room for at least two fingers.

Handle 14 includes a proximal edge 14a, affixed to ring 12, and a distal edge 14b spaced apart from ring 12. A lower edge 14c of handle 14 includes a depending projection 30 adjacent distal edge 14b, forming a concave finger grip 32 between projection 30 and lower edge 14c. In this way, a third finger assists in supporting handle 14 and cup holder 10.

Figures 3, 4:
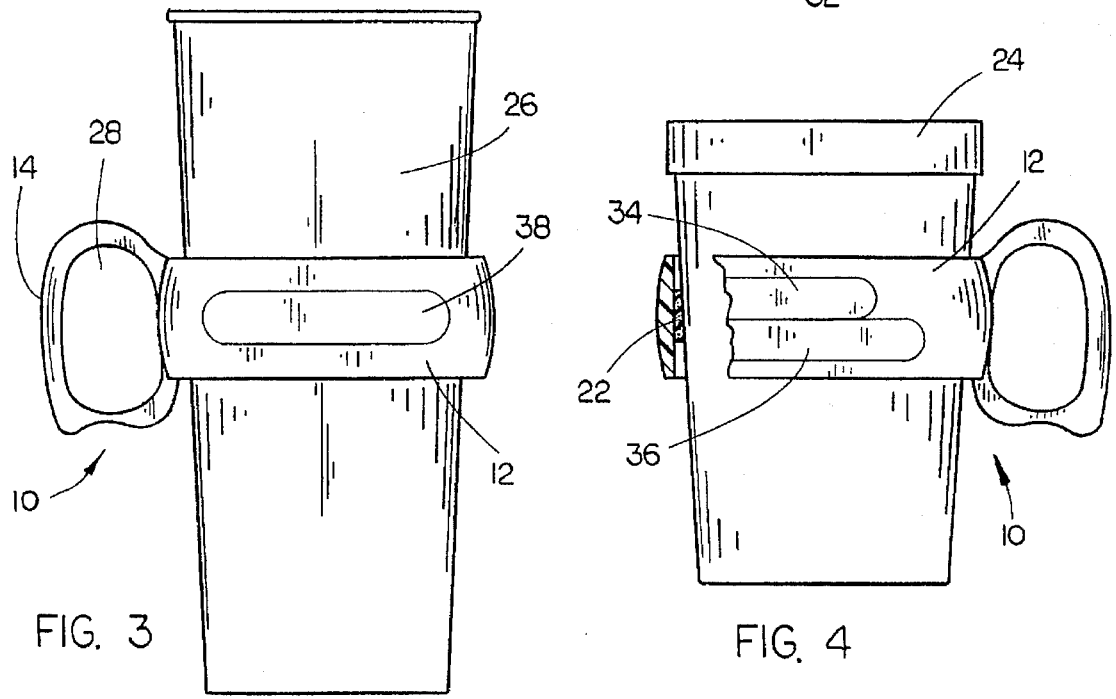
FIG. 3 is a rear elevational view of the holder with a large cup therein.
FIG. 4 is a front elevational view with a small cup therein.

Referring once again to FIGS. 1 and 4, outer surface 18 of ring 12 includes a forward portion 12c diametric a rearward portion 12d, a first end portion 12e and a diametric second end portion 12f, end portions located intermediate the forward and rearward portions. A pair of parallel elongated depressions 34 and 36 are formed circumferentially in outer surface 18 of ring forward portion 12c, and shaped to receive the palmar face of the index in middle finger of a hand. Preferably, depression 36, located below depression 34, is longer than depression 34 so as to receive the middle finger. A third depression 38 is formed diametric to depressions 34 and 36, and centered between the upper and lower edges of ring 12, as shown in FIGS. 1 and 3. Third depression 38 will receive the palmar surface of the thumb of the consumer's hand to permit gripping of ring 12 independently of handle 14.

Figure 5:
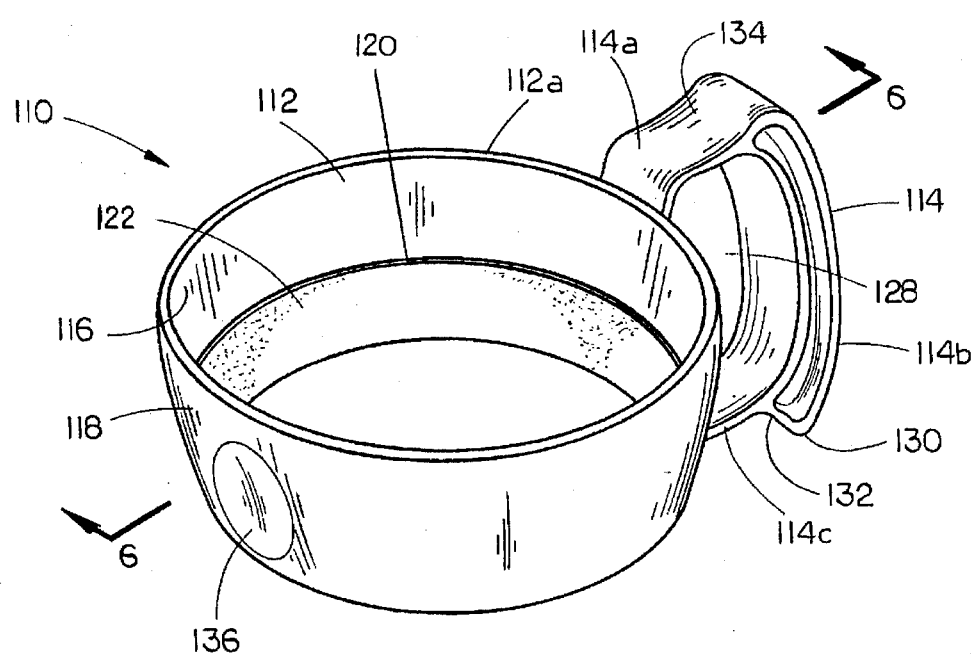
FIG. 5 is a perspective view of second embodiment of the cup holder.
Figure 6:
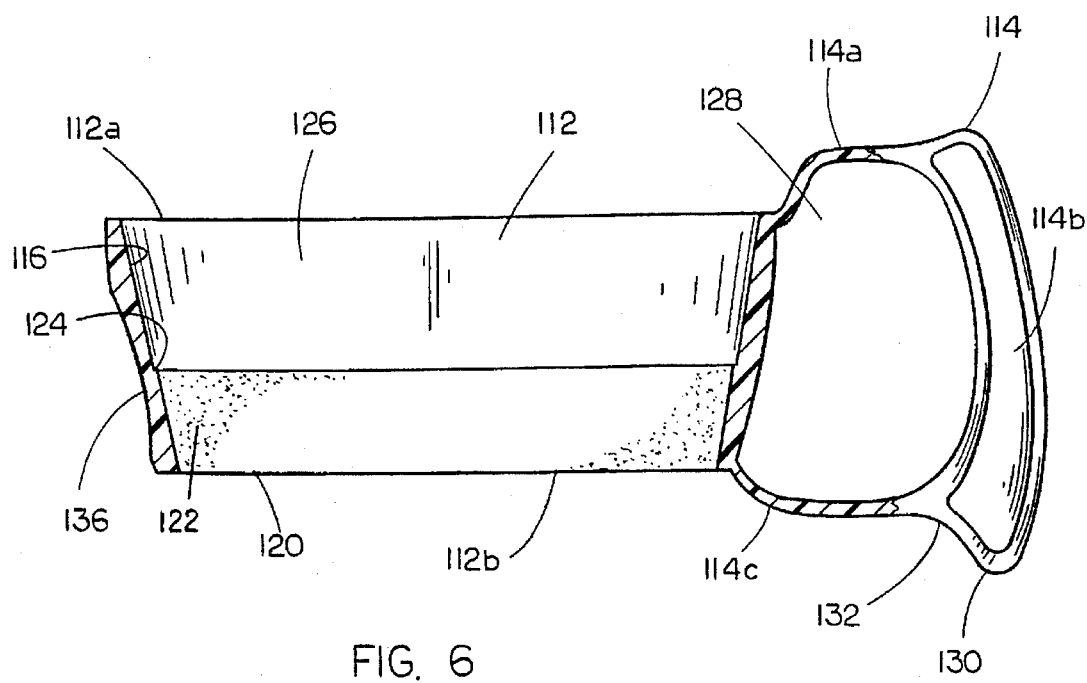
FIG. 6 is a sectional view taken at lines 6—6 in FIG. 5.

Referring now to FIGS. 5 and 6, a second embodiment of the invention is designated generally at 110, and includes a rigid ring 112 of thermally insulative material, such as plastic. Ring 112 includes an inner surface 116, an outer surface 118, and decreases in diameter from an upper edge 112a to a lower edge 112b to form a slight funnel shape. A handle 114 is affixed to outer surface 118 for supporting ring 112.

Inner surface 116 has a radially inwardly projecting band 120 at the lower end thereof, with a textured inward surface 122 which will frictional grip a disposable clip. Band 120 projects approximately 0.02 inches inwardly, and extends upwardly from lower edge 112b a height less than one half the vertical height of ring 112, to form a shoulder 124 along an upper edge thereof. Preferably, the upper portion 126 of inner surface 116 (located above shoulder 124) is glossy or "slick" to permit a cup to easily slide therealong. The position of band 120 at the lower end of inner surface 116, with a shallow thickness and a textured inward surface, is important so as to provide a stable support for a cup therein. The slight compressibility of foam and paper cups permits the cup to engage both the band 120, as well as portions of the upper end of inner surface upper portion 126, for a secure hold. Handle 114 is preferably formed of a rigid thermally insulative material formed in a vertically oriented loop orthogonal to the ring. A vertically extending elongated generally oval shaped aperture 128 within the loop of handle 114 provides sufficient room for at least two fingers.

Handle 114 includes an upper leg 114a, a vertical distal leg 114b, and a lower leg 114c, to form a loop. Lower leg 114c includes a depending projection 130 adjacent the lower end of distal leg 114b, forming a concave finger grip 132 between projection 130 and lower leg 114c. Finger grip 132 receives a third finger of a hand holding the handle 114, to assist in gripping the cup holder 110. A depression 134 is formed in the upper surface of upper leg 114a to receive the thumb of the hand holding handle 114.

Frequently, a consumer will support a coffee cup by gripping the cup around the upper edge thereof, rather than by the handle. To accommodate such a hold on ring 112, a thumb depression 136 is formed generally centrally between upper and lower edges 112a and 112b, diametric to handle 114. Depression 136 is generally circular in outline, but is generally cylindrical in shape, the axis of the cylinder oriented horizontally and orthogonal to a radius of ring 112. Thus, depression 136 will snugly receive a horizontally oriented, generally cylindrical member, —the palmar surface of the thumb—while the index and second fingers of the hand extend around ring 112 and through aperture 128 in handle 114.

Whereas the invention has been shown and described in connection with the preferred embodiment thereof, many modifications, substitutions and additions may be made which are within the intended broad scope of the appended claims.

I claim:

1. A cup holder comprising:

a ring of thermally insulative material, having an inner surface, an outer surface, and upper and lower edges;

said inner surface including an annular band projecting radially inwardly, the band having an annular inward surface textured to frictional engage a cup journaled through the ring;

said inner surface decreasing in diameter from the upper edge of the ring to the lower edge of ring; and said band extending upwardly from the ring lower edge to a shoulder spaced below the upper edge of the ring.

2. The cup holder of claim 1, wherein said band has a height, as measured from the ring lower edge to the shoulder, which is less than one half the height of the ring, as measured from the upper edge to the lower edge.

3. The cup holder of claim 2, further comprising a handle mounted on the outer surface of the ring formed in a vertical loop oriented orthogonal to the orientation of the ring.

4. The cup holder of claim 2, wherein said handle includes an upper leg, a vertical distal leg, and a lower leg interconnected to form the loop, and further comprising a projection depending from the handle at, the juncture of the lower leg and distal leg, forming a concave finger grip between the projection and the handle lower leg.

5. The cup holder of claim 4, wherein said handle upper leg includes a depression in an upper surface thereof to form a thumb grip.

6. The cup holder of claim 5, wherein said ring outer surface includes a depression formed therein and located generally diametric to the handle, for receiving the palmar surface of a thumb.

7. The cup holder of claim 6, wherein said thumb depression is generally circular in elevational view.

8. The cup holder of claim 7, wherein said thumb depression is generally cylindrical in shape, with an axis of the cylinder oriented horizontally and orthogonal to a radius of the ring.

9. The cup holder of claims 3, wherein said ring outer surface includes a depression formed therein and located generally diametric to the handle, for receiving the palmar surface of a thumb.

10. The cup holder of claim 9, wherein said thumb depression is generally cylindrical in shape, with an axis of the cylinder oriented horizontally and orthogonal to a radius of the ring.

11. The cup holder of claim 2, further comprising a handle mounted on the outer surface of the ring, and wherein said ring outer surface includes a depression formed therein and located generally diametric to the handle, for receiving the palmar surface of a thumb.

12. The cup holder of claim 1, wherein said thumb depression is generally cylindrical in shape, with an axis of the cylinder oriented horizontally and orthogonal to a radius of the ring.

13. The cup holder of claim 1, further comprising a handle mounted on the outer surface of the ring, and wherein said ring outer surface includes a depression formed therein and located generally diametric to the handle, for receiving the palmar surface of a thumb.

14. The cup holder of claim 13, wherein said thumb depression is generally cylindrical in shape, with an axis of the cylinder oriented horizontally and orthogonal to a radius of the ring.

* * * * *